United States Patent [19]

Björk

[11] 4,329,784

[45] May 18, 1982

[54] METHOD AND DEVICE FOR CHECKING THE DIMENSIONS OF VEHICLES

[75] Inventor: Bengt A. Björk, Eskilstuna, Sweden

[73] Assignee: Nicator Aktiebolag, Eskilstuna, Sweden

[21] Appl. No.: 198,948

[22] PCT Filed: Nov. 9, 1979

[86] PCT No.: PCT/SE79/00230

§ 371 Date: Jul. 14, 1980

§ 102(e) Date: Jul. 11, 1980

[87] PCT Pub. No.: WO80/01001

PCT Pub. Date: May 15, 1980

[30] Foreign Application Priority Data

Nov. 14, 1978 [SE] Sweden .............................. 7811757

[51] Int. Cl.³ .............................................. G01B 5/25
[52] U.S. Cl. ........................... 33/180 AT; 33/181 AT; 33/288
[58] Field of Search ............ 33/180 AT, 181 AT, 288

[56] References Cited

U.S. PATENT DOCUMENTS

| 2,900,734 | 8/1959 | Richards | 33/180 AT |
| 3,805,396 | 4/1974 | Hunnicutt | 33/180 AT |
| 3,869,804 | 3/1975 | Friend | 33/288 |
| 4,015,338 | 4/1977 | Kunze et al. | 33/193 |
| 4,015,339 | 4/1977 | Hörvaccius | 33/180 AT |
| 4,165,567 | 8/1979 | Olsson | 33/288 |
| 4,174,623 | 11/1979 | Le Grand et al. | 33/180 AT |
| 4,207,681 | 6/1980 | Bayorgieon et al. | 33/180 AT |

FOREIGN PATENT DOCUMENTS 2019573  10/1979  United Kingdom .......... 33/181 AT

Primary Examiner—Willis Little
Attorney, Agent, or Firm—Fleit & Jacobson

[57] ABSTRACT

A method and a device for checking the dimensions of vehicles, preferably in connection with carrying out alignment work thereon. The method and the device use a reference frame (1) which is suspended from the chassis of the vehicle. Indicators (5, 12) are disposed at selected check points in the vehicle to indicate a possible deviation in position from a desired value at an individually selected check point on the vehicle, the nominal position of which is known and which is characteristic of the vehicle. The indicators comprise first indicator elements each in the form of a vertically adjustable lead rule (12) which is suspended in said check point or in points related thereto outside the vehicle, and second indicator elements in the form of horizontally adjustable reference pins (5). The distance between a selected reference point (12a) on the first indicator element and a selected reference point (5a) on the second indicator element constitutes a measure of the deviation sought.

10 Claims, 7 Drawing Figures

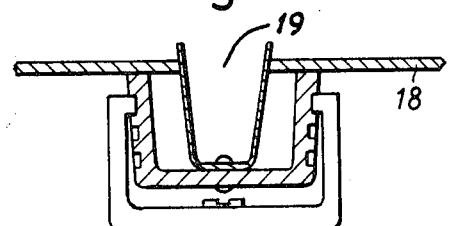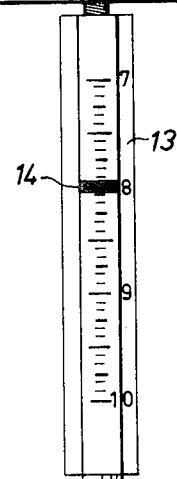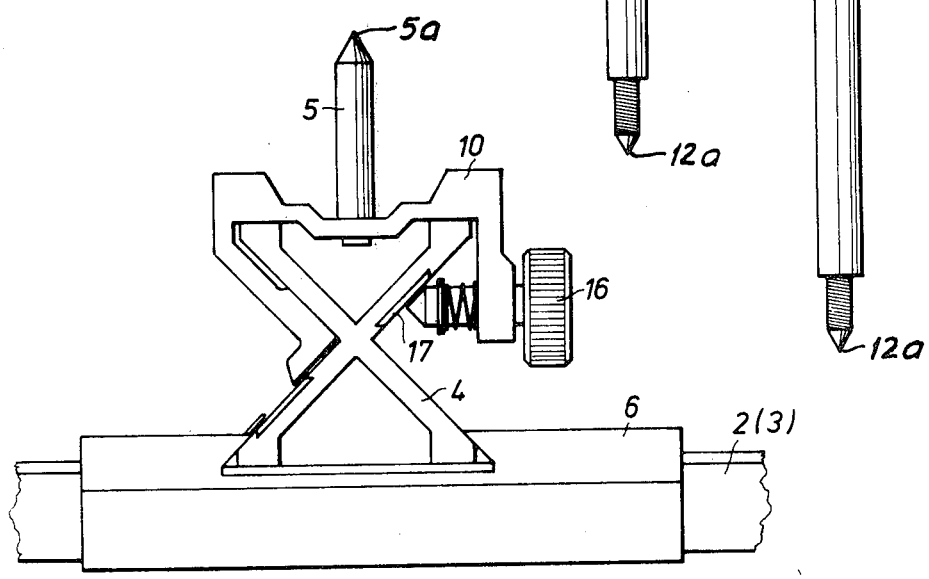

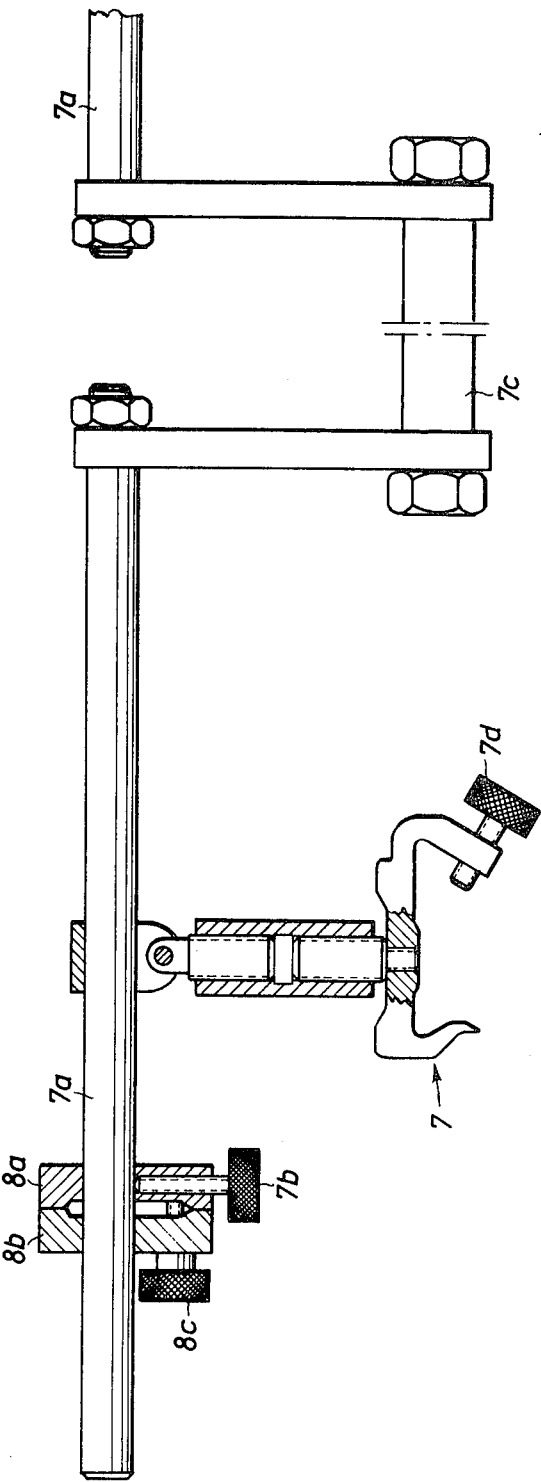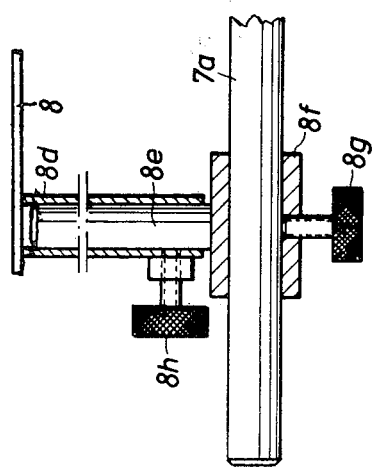

METHOD AND DEVICE FOR CHECKING THE DIMENSIONS OF VEHICLES

TECHNICAL FIELD

The present invention relates to a method of checking the dimensions of vehicles, preferably in connection with carrying out alignment work on these, in which method a reference frame, which is provided with at least one longitudinal main beam provided with a measuring scale and transverse side beams likewise provided with measuring scales and displaceable in relation to the main beam, are suspended on the chassis of the vehicle, and at each checking point selected in the vehicle there is placed an indicator adapted to indicate a possible deviation in position from a desired value at an individually selected check point on the vehicle, the nominal position of which is known and which is characteristic of the vehicle.

The invention likewise relates to a device for checking the dimensions of vehicles, preferably in connection with carrying out alignment work thereon, which device comprises a reference frame which comprises at least one longitudinal main beam provided with a measuring scale and transverse side beams likewise provided with measuring scales and displaceable in relation to the main beam, the reference frame being adapted to be suspended from the chassis of the vehicle by means of securing members, and which device comprises a plurality of indicators disposed at selected check points inside the vehicle, each adapted to indicate possible deviations in position from a desired value at an individually selected check point on the vehicle, the nominal position of which is known and which is characteristic of the vehicle.

PRIOR ART

During the straightening of collision damage on vehicles, particularly motor vehicles, it is of the greatest importance that the damage portions of the frame or corresponding parts of the chassis with self-supporting bodies, should be restored to their positions precisely laid down by the manufacturer. For this purpose, various methods and devices have been proposed to indicate or measure possible faulty dimensions on the vehicle. The known indicating equipment often includes a reference frame which either constitutes a support on which the vehicle rests (see, for example, the German Patent DE 2 324 530 as laid open) or which is suspended under the vehicle and which therefore accompanies a change in position in the check points of this during the alignment work (see, for example, the U.S. Pat. No. 3,869,804). The reference frame is often provided with fault indicators in the form of upwardly directed uprights or mandrels, mounted for displacement on transverse section beams, which in turn are displaceable on longitudinal section beams, which beams together form the reference frame. The mandrels can be raised and lowered and are adapted to be adjusted in relation to predetermined check points on the chassis of the vehicle during the checking of a vehicle and then to be locked in their setting. It can happen, however, that the upper end or point of the mandrels hooks firmly in the check points and accompany their movement, in which case the mandrel easily buckles or breaks, so that the indicating equipment becomes useless. Particularly serious damage to the mandrels can occur if they are not released but accompany some check point which moves obliquely downwards during the alignment work. Often the mandrels have to be lowered after each check, in which case it is easy for the operator to forget some mandrels in the locked position, particularly if there are many check points on the vehicle. In addition, the loosening and lowering of these mandrels is a very time-consuming operation which is particularly noticeable with repeated checks at the end of each alignment work.

In the device known from the U.S. Pat. No. 3,869,804 an attempt has been made to solve this problem by letting the mandrels be fitted comparatively loosely so that they can yield when alignment forces occur. This means, however, on the one hand that the mandrels can assume faulty positions, on the other hand that the operator easily risks forgetting to loosen all the mandrels to a sufficient extent which can be expected to be acted upon by alignment forces.

DISCLOSURE OF THE INVENTION

All the above-mentioned disadvantages are eliminated by the method and device according to the invention.

The method according to the invention involves the indicators being placed in the form of two indicator elements the positions of which are adjustable in relation to one another, that in each indicator, a first indicator element, which is made elongated, is suspended like a lead in each of said selected check points on the vehicle, and on which first indicator element, a first reference point is selected, that in each indicator, a second indicator element is placed on the reference frame, and on each said second indicator element a second reference point is selected, the position of which in the horizontal plane is adjustable depending on the type of vehicle, and that in each indicator, one kind of indicator element, preferably said first indicator element, is given an extension predetermined individually in height and determined by the type of vehicle, while the opposite kind of indicator element is given an extension constant in height, as a result of which the spacing between the reference points in each indicator constitutes a measure of said deviation in position.

The device according to the invention implies that each indicator consists of two indicator elements which are adjustable in position in relation to one another, that in each indicator a first indicator element is elongated and adapted to be suspended like a lead in each of said selected check points on the vehicle and which first indicator element comprises a first reference point, that in each indicator a second indicator element is mounted on the reference frame and comprises a second reference point, the position of which in the horizontal plane is adjustable depending on the type of vehicle, and that in each indicator the one kind of indicator element, preferably said first indicator element, each has an extent adjustable individually in height, which is determined by the type of vehicle, while the opposite kind of indicator element has an extent which is constant in height, as a result of which the spacing between the reference points in each indicator constitutes a measure of said deviation in position.

Because the indicator elements connected to the check points of the vehicle are freely suspended like leads, they can easily bend under all external forces which occur when they come into contact with the indicator element of the reference frame during the carrying out of the alignment work. At the same time, the invention means that during the whole alignment work, a convenient and clear indication of the possible deviation of all check points from their respective desired values is constantly obtained.

DESCRIPTION OF THE FIGURES

The invention is described in more detail below with reference to the accompanying drawing.

FIG. 3 shows an end view of such a beam crossing.

FIG. 4a shows a lead-line fastened in a predetermined check point in the chassis of a vehicle.

FIG. 4b shows an extension bar for the lead-line of FIG. 4a.

FIGS. 5a and 5b show two different detail forms of a fastening member for suspending the reference frame under the vehicle.

BEST FORM OF EMBODIMENT

Figure 1:
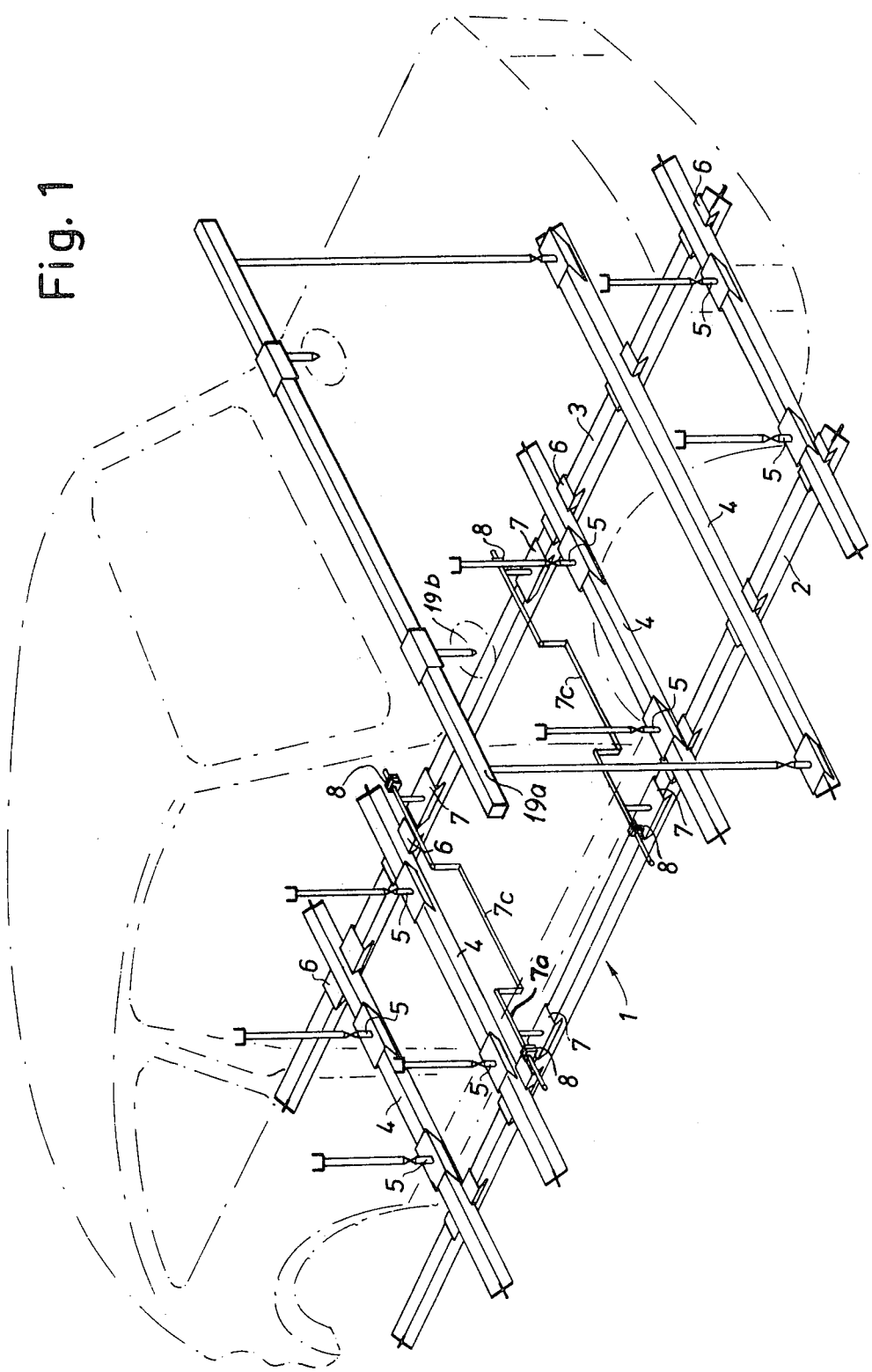
FIG. 1 shows a perspective view of the best form of embodiment of a device according to the invention, with a vehicle which is to be checked indicated in chain line.
Figure 2:
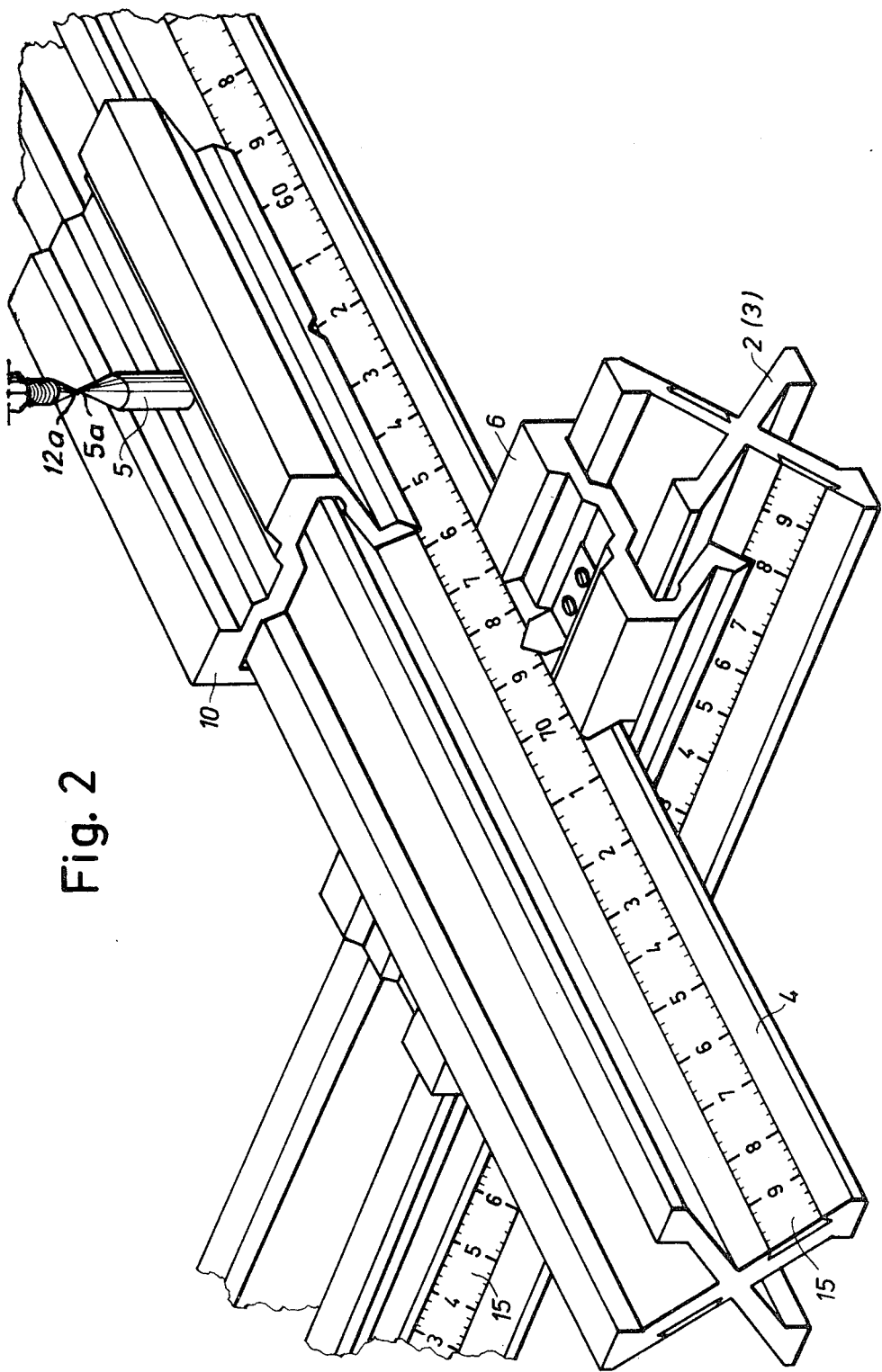
FIG. 2 shows a detail view in perspective of the point of intersection between a longitudinal and a transverse section beam according to FIG. 1.

As can be seen from FIG. 1, the device according to the invention comprises a reference frame 1 which is composed of two longitudinal main beams 2, 3 across which there extend a suitable number of transverse side beams 4 to support the necessary number of upwardly directed indicator elements in the form of reference pins 5. In order to render possible a completely free adjustability of the beams at the crossing points, the transverse and longitudinal beams 4 and 2, 3 respectively are connected to one another by means of crossing slides 6. In order to achieve the necessary bending strength in the reference-frame beams, these should appropriately have a very bending-resistant cross-section such as an X-shape or the like and such a sectional shape also renders it possible for the crossing slides 6 to be easily made displaceable guided on the two section beams 2, 3 and 4 crossing one another, as can be seen in particular from FIG. 2. Nevertheless it is, of course, also possible to use other cross-sectional shapes with greater or less bending strength.

According to the invention, the reference frame 1 is adapted to be disposed hanging under the chassis of the vehicle in that fastening members 8 on the frame are connected to doorsill or corresponding parts of the vehicle. Preferably at least one pair of fastening member slides 7 are disposed for displacement on each longitudinal reference-frame beam 2, 3 and each carry their own holding rod 7a, which is likewise displaceable, with a said fastening member 8, adjustable in its longitudinal direction and adapted to be connected to the doorsill or the like of the vehicle, not shown. It is well-known that the majority of manufacturers of self-supporting vehicle bodies, particularly for passenger cars, make their bodies with substantially straight doorsill beams or doorsill housings which moreover are parallel to the floor of the vehicle. With other vehicles where this may not apply or where the damage is of such a nature that suspension of the beams by means of the fastening members 8 is impossible, these members 8 may also be provided with a permanent magnetic portion, not shown, by means of which the reference-frame beams 2, 3 can be located almost without exception.

Because of the holding rods 7a, the fastening-member slides 7 and hence the respective longitudinal reference-frame beams 2, 3 do not need to be placed substantially straight under the doorsill of the body but can be disposed at a suitable distance inside or outside this. In other words the possibility is obtained of adjusting the position of the frame 1, as may prove necessary when fitting this under the vehicle. The fastening member 8 may be of any suitable type for the necessary cooperation with the doorsill portion of the vehicle body, and for example as shown in FIG. 5a, an embodiment with which the fastening member consists in known manner of a pair of opposite clamping jaws 8a, 8b, which can be joined together by means of one or more clamping screws 8c. The clamping jaws 8a, 8b are displaceable along the holding rods 7a and can be locked on this by means of a locking screw 7b for example. The slide 7 is in turn locatable in the adjusted position on the reference-frame beam 2, 3 by means of a set screw 7d. In order to simplify handling, the holding rods 7a may appropriately be jointly or mutually connected to each opposite pair of fastening members 8 in the transverse direction of the vehicle, as via a lower intermediate rod 7c. FIG. 5b shows another form of fastening member intended in particular for hooking to the top of a doorsill of the body. The fastening-member slide 7 carries a fastening member 8 which projects to the side and which is adapted to be fitted above a doorsill, not illustrated, of a vehicle body and which is fixed to a tubular sleeve 8d, threaded over a pin 8e, which projects upwards from a guide sleeve 8f which is disposed for displacement on the holding rod 7a and can be locked on this by means of a screw 8g. The tubular sleeve 8d may appropriately also be disposed for displacement on the pin 8e and be able to be locked on this in the desired position of height by means of a locking screw 8h.

Disposed, as stated, on the transverse section beams 4 are upwardly directed reference pins 5 which form said second indicator elements. Each such pin 5 may appropriately comprise, at its upper end, a point 5a, see FIG. 3, which forms said second reference point. The pin 5 is fixed in a reference-pin slide 10 which is disposed for displacement and locking on the transverse reference-frame beam 4. The pins 5 preferably have the same constant length, see FIG. 1, and the tips 5a are preferably situated in one and the same reference plane as can be seen from FIG. 1. Usually, the check points occur in pairs symmetrically at each side of the longitudinal central line of the vehicle and therefore two reference-pin slides 10 with associated pins 5 are usually disposed on each such transverse reference-frame beam 4, but more or fewer pins 5 may be provided.

Rules 12 serving as leads, already known per se in principle (see for example the U.S. Pat. No. 4,015,338) are adapted to be fitted in the predetermined check points of the vehicle which depend on the type of vehicle, as can be seen from FIG. 4a. These lead rules 12 form said first indicator element. The check points usually consist of holes or projections in the bottom plate or frame members of the vehicle. FIG. 4a shows a bottom plate 18 with such a hole 19. The fastening at the check points may appropriately be effected by means of a universal-joint device of the type shown in FIG. 4a and which is known in connection with translucent rules for use in connection with measuring with laser radiation. In the present case, however, the actual rule portion 12 is in the form of a cylindrical rod which is displaceable in a graduated sleeve 13 of some suitable transparent material such as acrylic glass. The rod 12 comprises, at its lower end a point 12a, which forms said first reference point and which is adapted for adjustment towards and cooperation with the tip 5a on the corresponding reference pin 5. The lower part of the rod 12 may, however, be threaded for cooperation with an extension rod 12b, as shown in FIG. 4b.

The sectional beams 2, 3 and 4 of the reference frame may appropriately be provided with measuring scales 15. If locking screws 16 are used to fix the position of the reference-pin slides and/or the other slides, the beams should also be provided with a protective layer 17 in the form of an inserted steel band or the like along the region where the locking screw 16 acts on the beam, if this is made of soft material such as aluminium.

When carrying out a vehicle check by the method according to the invention, the two longitudinal sectional beams 2, 3 are mounted hanging under the vehicle in that the fastening members 8 present on these beams are firmly hooked to the top of the doorsill housings or doorsill beams in the vehicle or are fastened in folds at the under side of these. If this is not possible because of local damage or for another reason, these beams are fastened by means of the magnetic fastening-member portions. These longitudinal sectional beams 2, 3 are adjusted in balance with the doorsill housings of the car and then constitute the reference plane for the fault indication. Then the necessary number of transverse sectional beams 4 is mounted above these longitudinal sectional beams 2, 3 by means of crossing slides 6. Each of these transverse beams 4 carries a suitable number of reference-pin slides 10 with associated reference pins 5, for example two or three. The transverse reference-frame beams 4 are adjusted to the correct longitudinal measurement along the two suspended longitudinal sectional beams 2, 3, that is to say in the intended longitudinal positions for the check points. The correct breadth of the vehicle is then adjusted by means of two reference-pin slides 10 along those of the transverse sectional beams 4 which are situated under two undamaged check points. The height bars 12 are then adjusted in their sleeves 13 to the correct height and are suspended in position at the first check points, such as the hole 19 shown for example in FIG. 4a in the bottom plate 18 of the vehicle. Then the next transverse sectional beam 4 is adjusted, counting from the undamaged end of the vehicle towards the damaged end, and its slides 10 are adjusted in the correct positions of length and breadth. The next pair of height bars 12 is adjusted to the correct height in their sleeves 13 and are mounted in the next pair of check points and so on. When all the height bars 12 have been placed in position and all the transverse sectional beams 4 have been adjusted to the intended positions in length and breadth, the damage to the vehicle can be mapped out in that the distance between each tip 12a and the corresponding tip 5a constitutes a measure of the deviation in position from a desired value at an individually selected check point on the vehicle, the nominal position of which is known. If necessary, the whole reference frame in its assembled state can be finely adjusted in height, length and breadth so as to coincide completely with the undamaged check points. During a following alignment operation which is carried out on the vehicle, the height bars 12 like the reference pins 5 can remain in position since the bars 12 are suspended with universal joints at the check points and so can easily yield to possible obstacles, which consist mainly of the reference pins 5. The device can thus be used during the whole alignment operation and provides continuous information as to how the work is progressing and when the damage has been remedied.

Instead of suspending the lead rules 12 directly in the check points of the vehicle, they can be suspended in check points 19a disposed outside the vehicle, see FIG. 1, which are related by means of a link and reference-tip arrangement shown diagrammatically, to the actual check points 19b of the vehicle.

I claim:

1. A method of checking the dimensions of vehicles, preferably in connection with carrying out alignment work thereon, using indicators being placed at selected check points on the vehicle, said method comprising the steps of:

suspending a reference frame from the chassis of the vehicle, suspending a first, elongated indicator element of each indicator like a lead from selected check points on the vehicle so as to be universally movable with respect to the vehicle, selecting a first reference point on said first indicator element, placing a second indicator element of each indicator on the reference frame, selecting a second reference point on each said second indicator element, adjusting the second indicator elements with respect to the frame to position the second reference point of each second indicator in locations determined by the type of vehicle, adjusting one of the indicator elements, preferably the first indicator element, of each indicator vertically so as to individually position a respective one of the reference points of each indicator in a vertical position determined by the type of vehicle, and measuring the distance between the reference points of each indicator, said distance constituting the deviation in position of the respective check point from the desired value.

2. The method of claim 1, wherein said step of adjusting the second indicator elements includes the step of adjusting said second indicator elements so as to dispose said second reference points in the same plane.

3. A device for checking the dimensions of a vehicle, preferably in connection with carrying out alignment work on the vehicle, which device comprises: a reference frame comprising at least one longitudinal main beam provided with a measuring scale and transverse side beams provided with measuring scales and displaceable in relation to the main beam, the reference frame having fastening members for suspending the reference frame from the chassis of the vehicle, a plurality of indicators positionable at selected check points with respect to the vehicle, each indicator being adapted to indicate a possible deviation in position from a desired value of an individually selected check point, the nominal position of each check point being a characteristic of the vehicle, each indicator comprising two indicator elements, a first of the indicator elements being hung to depend downwardly from a selected check point on the vehicle to thereby provide a first reference point, a second of the indicator elements being disposed on the reference frame to provide a second reference point, the position of the second reference point being adjustable in a horizontal plane depending on the type of vehicle, one of said first and said second indicator elements in each indicator being adjustable individually in height, in accordance with the type of vehicle, while the other of said indicator elements has a constant extent in height, as a result of which the distance between the reference points provided by the individual indicator elements of each indicator constitutes a measure of the deviation in position of the selected check point.

4. A device as claimed in claim 3, characterised in that the second reference points of the second indicator elements are situated in the same plane.

5. A device as claimed in claim 3, characterised in that said first indicator element consists of a lead rule with a pointed lower end, the point of which forms said first reference point, and that said second indicator element consists of an upwardly directed pin, which is displaceable along one of said side beams and which comprises, at its upper end, a point which forms said second reference point.

6. A device as claimed in claim 3, further comprising a universal-joint device for suspending said first indicator element from a check point on the vehicle.

7. A device as claimed in claim 3, characterised in that said first indicator element includes a graduated sleeve of transparent material, said first indicator element being adjustable in height in the graduated sleeve of transparent material.

8. A device as claimed in claim 3, characterised in that a cooperating extension piece is connectable to said indicator element adjustable in height.

9. A method of checking the dimensions of a vehicle against preselected values comprising:
suspending a plurality of first indicator elements from the vehicle to depend downwardly from check points determined by the preselected values, a portion of each of the first indicator elements defining a first reference point;
suspending two longitudinally extending beams of a reference frame beneath the chassis of the vehicle, the reference frame having a plurality of transverse beams adjustable with respect to the longitudinally extending beams, each of the transverse beams carrying at least one upwardly extending second indicator element in such manner that the position of the second indicator element is adjustable with respect to the transverse beam, a portion of each of the second indicator elements defining a second reference point;
adjusting the relationship between the transverse beams and the longitudinally extending beams so as to position each of the transverse beams under a predetermined portion of the chassis;
adjusting the location of each of the second indicator elements on its respective transverse beam to position the second indicator elements at predetermined positions corresponding to desired locations of the check points;
adjusting the heights of one of said first and said second indicator elements to preselected values determined by the vehicle being checked; and
measuring the distance between said first and said second reference points to thereby check dimensions of the vehicle against preselected values.

10. A device for checking the dimensions of a vehicle against predetermined values comprising:
a plurality of first indicator elements adapted for connection to individual check points of the vehicle representative of the values to be checked, each of the first indicator elements having a portion positionable below the vehicle to define a first reference point;
a reference frame comprising two longitudinally extending main beams, a plurality of transversely extending side beams, and slide means for interconnecting said main beams and said side beams so that the positions of said side beams on said main beams are adjustable;
means for suspending said reference frame beneath a chassis of the vehicle being checked;
a plurality of second indicator elements adjustably carried by said side beams, each of said second indicator elements having an end extending toward the vehicle chassis defining a second reference point, the relationship between said side beams and said main beams being adjustable and the relationship between said second indicator elements and respective ones of said side beams being adjustable to position said second reference points in positions corresponding to check points of the vehicle to be checked, one of said first indicator elements and said second indicator elements being adjustable in height so that horizontal and vertical distances between said first and said second reference points provide checks of the dimensions of the vehicle against predetermined values.

* * * * *